United States Patent [19]

Schaub et al.

[11] 4,306,526

[45] Dec. 22, 1981

[54] INTERNAL COMBUSTION ENGINE

[75] Inventors: Fred S. Schaub; Melvin J. Helmich; Robert L. Hubbard; Melvin C. Hoagland, all of Mount Vernon, Ohio

[73] Assignee: Cooper Industries, Inc., Houston, Tex.

[21] Appl. No.: 910,581

[22] Filed: May 30, 1978

[51] Int. Cl.$^3$ .............................. F02B 19/00
[52] U.S. Cl. ........................ 123/257; 123/65 BA; 123/259
[58] Field of Search ......... 123/27 GE, 65 BA, 32 SP, 123/32 ST, 119 CD, 191 S, 191 SP, 65 R; 60/599

[56] References Cited

U.S. PATENT DOCUMENTS

| | | | |
|---|---|---|---|
| 2,723,653 | 11/1955 | Blake et al. | 123/27 GE |
| 2,763,248 | 9/1956 | Green et al. | 123/32 SP |
| 2,773,490 | 12/1956 | Miller | 123/432 X |
| 2,799,255 | 7/1957 | Gehres | 123/32 SP X |
| 2,849,992 | 9/1958 | Stillebroer et al. | 123/32 SP |
| 2,936,575 | 5/1960 | Lieberherr | 123/119 CD X |
| 3,029,594 | 4/1962 | Miller | 123/119 CD X |
| 3,650,255 | 3/1972 | McJones | 123/120 |
| 3,680,305 | 8/1972 | Miller | 123/65 BA X |
| 3,890,942 | 6/1975 | Date et al. | 123/32 SP X |
| 3,937,188 | 2/1976 | Wrigley | 123/32 SP |
| 3,983,847 | 10/1976 | Wyczalek et al. | 123/32 SP |

OTHER PUBLICATIONS

*Diesel and High-Compression Gas Engines-Fundamentals*, by Edgar J. Kates, copyright 1965 by American Technical Society, pp. 361-367.

Primary Examiner—Tony M. Argenbright
Attorney, Agent, or Firm—Wilson, Fraser, Barker & Clemens

[57] ABSTRACT

A method of combusting natural gas fuel in a two cycle, turbocharged internal combustion engine substantially reduces the production of nitrogen-oxygen emissions. An improved turbocharger design provides increased air charging pressure, produces a controlled lean air/fuel mixture and lowers peak combustion temperatures. A jet cell ignition device ensures uniform, reliable ignition of the lean air/fuel mixture under all operating conditions and the lean air/fuel mixture in turn encourages complete fuel combustion and provides excellent combustion characteristics with methane, ethane and heavier paraffinic hydrocarbon fuels. These structural modifications and adjustment of other operating parameters combine to reduce nitric oxide (NO) and nitrogen dioxide ($NO_2$) emissions by as much as 75% while effecting only a negligible increase in fuel consumption.

15 Claims, 7 Drawing Figures

INTERNAL COMBUSTION ENGINE

BACKGROUND OF THE INVENTION

The invention relates generally to a method of reducing exhaust emissions from two cycle gas engines and more specifically to a method of reducing nitric oxide and nitrogen dioxide of emissions from two cycle, turbocharged, natural gas, internal combustion engines.

Large bore, two cycle, internal combustion engines have proven their worth in many extended service applications requiring low r.p.m., high horsepower at stationary sites or in heavy equipment. Such engines are frequently used to power compressors on natural gas transmission lines, in diesel-electric locomotives or aboard ships. In such varied applications the engine is often adapted to utilize the most readily available or least expensive fuel. A pipeline compressor engine will operate on natural gas whereas a locomotive or ship engine will commonly operate on diesel fuel. The fuel adaptability of such engines is indicative of the sophistication of such engines in other areas.

Design and development of two cycle engines has been directed to many features and operational parameters of the engine. Understandably, much early research was devoted to improving the power output and efficiency of such engines. One approach attempted to ensure the complete evacuation of the products of combustion from the combustion chamber to encourage the ingestion of a maximum volume of fresh air and fuel. This evacuation or scavenging was found to be related to the location and size of the intake and exhaust ports as well as the configuration of the piston crown. U.S. Pat. No. 2,706,971 is directed to these considerations and to improvements therein.

Another area of development involved the combustion characteristics of an engine at low loads and low r.p.m. Generally speaking, the air/fuel ratio of an engine operating under low load conditions will be high, that is, the mixture will be lean. In most engines, this will create combustion difficulties since only exceedingly well mixed gas air volumes will ignite and sustain combustion properly. This problem becomes increasingly serious as the air/fuel ratio increases. In more conventional (i.e., small bore) engines, the relatively compact dimensions of the combustion chamber tend to minimize difficulties associated with complete mixing of lean combustion mixtures since the air and the gas are relatively easily uniformly distributed within the small volume of the combustion chamber.

In large bore internal combustion engines, which may typically have displacements of nearly four cubic feet, air/fuel mixing at high air/fuel ratios poses a difficult problem. Unchecked, the problem manifests itself as incomplete combustion, increased unburned hydrocarbon emissions and rough and irregular engine operation. The situation is further aggravated in gas pipeline compressor applications by the acknowledged necessity of such compressors to be driven at a constant speed. U.S. Pat. No. 2,723,653 is directed to the problem of low load operation of natural gas fueled engines.

U.S. Pat. No. 2,799,255 to Gehres discloses a two cycle engine incorporating a jet igniter cell. A small cell or secondary combustion chamber is in communication with the main combustion chamber and is independently supplied with a rich fuel mixture which is ignited by a spark plug controlled by the timing and ignition components of the engine. The hot gases from the jet cell in turn ignite the lean main combustion chamber mixture reliably and completely.

Other areas of development reflect contemporary economic conditions and trends. In 1965, when natural gas was abundant, price-controlled and therefore inexpensive, U.S. Pat. No. 3,187,728 disclosed a method and apparatus for converting a diesel engine to operate on natural gas. In 1978, the scarcity and presumed eventual de-regulation of the cost of natural gas has prompted research and development of a method and apparatus for converting a natural gas engine to operate on diesel fuel. U.S. Pat. No. 4,091,772 discloses such a configuration, now commonly owned application Ser. No. 686,279 filed May 14, 1976.

Until recently, one area of two cycle, large bore engine operation that had escaped scrutiny was exhaust emissions. Theoretical hydrocarbon chemistry explains that the combustion of natural gas which is constituted primarily of methane and ethane with oxygen produces carbon dioxide, carbon monoxide and water. However, since carbon, hydrogen and oxygen are not the only elements present during the combustion process, this theoretical explanation is accurate but not complete. Nitrogen, which constitutes approximately 80% of the atmosphere is also present and is affected by the combustion process. Nitrogen is present in the atmosphere in diatomic molecular form, designated $N_2$. Since nitrogen is ingested into the combustion chamber with oxygen, it is present during the combustion process. The $N_2$ molecules, heated by combustion, dissociate and combine with oxygen to form NO, nitric oxide, and $NO_2$, nitrogen dioxide. (These two nitrogen-oxygen compounds are commonly lumped together and referred to as $NO_X$.) These nitrogen bearing exhaust constituents have been identified as being highly deleterious to the atmosphere and living organisms and have thus become a target for minimization and elimination by internal combustion engine manufacturers.

A second group of exhaust constituents which have been targeted for reduction encompasses those products which devolve from incomplete combustion, such as unburned hydrocarbons and carbon monoxide. These exhaust constituents generally result from incomplete combustion due to incomplete air/fuel mixing and rich fuel/air mixtures.

Increasingly stringent emission standards promulgated by regulatory agencies of the federal and state governments have added immediacy to the search for engines and operating modes which lower total hydrocarbon and nitrogen related engine emissions.

One such search is described in Paper No. 71-WA/DGP-2 of the American Society of Mechanical Engineers. Published in 1971, the paper delineates research directed to the reduction of $NO_X$ emission in large bore diesel and natural gas engines. Operational parameters were individually varied to simulate a broad latitude of operating conditions. It was determined that $NO_X$ formation is sensitive to manifold temperature and air charging pressure. A reduction of $NO_X$ formation with increasing engine speed was also noted and attributed to the decreased residence time of the nitrogen gas within the combustion chamber at an elevated temperature during which the nitrogen might dissociate.

The indicated reduction of $NO_X$ and hydrocarbon emissions under high pressure, temperature and r.p.m. conditions did not, however, generate a pattern warranting further examination. In fact, certain operating data were recorded which ran precisely counter to the general trends described previously. The logical conclusion was that some unobserved parameter or interaction of parameters was affecting the emission performance of the engine in a fashion which was not then understood.

SUMMARY OF THE INVENTION

The instant invention is directed to a method of combusting natural gas in a turbocharged, two cycle engine. The engine incorporates both a jet cell auxiliary combustion chamber and high pressure turbocharging to provide both superior engine performance across the load and r.p.m. spectrum as well as greatly reduced $NO_X$ (nitric oxide and nitrogen dioxide exhaust emissions). The substantially conventional engine and jet cell incorporates a turbocharger specifically designed to provide optimum performance at manifold pressures substantially above those customarily utilized in conventional super- and turbocharged engines.

Under all operating conditions, even full load, the engine of the instant invention functions at a lean air/fuel ratio in the main combustion chamber. An air/fuel weight ratio of 20.3:1 is typical and it may vary between 18.2:1 and 22.4:1. As stated previously, a lean air/fuel mixture is generally more difficult to combust than an air/fuel mixture relatively close to the stoichiometric weight ratio of 14:1. It thus follows that as the air/fuel mixture becomes increasingly lean at low load operating conditions, satisfactory combustion becomes increasingly difficult to attain. The jet cell ignition device is directed to improving the performance of the engine, especially under low load operating conditions. The jet cell ignition device is mounted in the cylinder head and includes a spark plug and pressure sensitive fuel valve which controls the admission of gaseous fuel into the jet cell. As pressure within the cylinder lowers near the end of the exhaust stroke, this pressure sensitive valve opens and allows a fresh charge of gas to enter the jet igniter cell. The volume of the jet cell is approximately 2% of the clearance volume of the cylinder. A conventional cam driven main fuel valve admits the primary fuel charge into the main combustion chamber. A timed spark ignites the relatively rich air/fuel mixture in the jet cell and hot gases issuing from the jet cell provide sufficient energy to ignite and sustain complete combustion of the more lean mixture in the main combustion chamber. The jet cell thus encourages complete and reliable combustion of the main combustion chamber charge—a charge which is leaner than a conventional engine charge and markedly leaner than such engines at low load.

The turbocharger ensures an appropriately scaled lean air/fuel mixture across the entire load and r.p.m. spectrum. Charging pressures average approximately 50% above those associated with conventional turbocharged, natural gas engines. Details of the turbocharger design will be explained further in the following description of the preferred embodiment. Here, it is sufficient to point out that the instant turbocharger design, since it naturally elevates the operating pressure of the entire air system, must function at its highest efficiency at compressor and expander pressures substantially above those associated with conventional turbochargers.

Although the mechanisms of $NO_X$ formation are not fully understood, a correlation devolves from the proportional relationship between combustion temperature and combustion charge residence time. Increased combustion time and especially temperature appear to encourage the dissociation of the diatomic $N_2$ and the formation of NO, nitric oxide, and $NO_2$, nitrogen dioxide. Lowering the combustion temperature and residence time by utilizing higher combustion chamber charging pressures and air/fuel ratios has been a goal.

The operating methods herein described and claimed result in an approximate average $NO_X$ emission reduction of 68% on a gram per horsepower hour basis and a 72% $NO_X$ emission reduction in parts per million basis.

Such substantial emission reduction would, however, not be notable if it were accompanied by an equally substantial increase in fuel consumption. That is, in view of the contemporary emphasis on both fuel conservation and reduced emissions, a combustion method which merely exchanged energy efficiency for lower emissions would be of marginal value. The accompanying data of Table 1 disclose that the average brake specific fuel consumption (BSFC) of an engine operating according to the instant invention increases by an insignificant amount (approximately 2%).

The preferred fuel for operating an engine according to the instant invention is natural gas. However, since the lean air/fuel gas fuel mixture operates so much below its detonation point, the engine operating method is fully adaptable to use with lower octane paraffinic hydrocarbons such as propane, butane and pentane.

Furthermore, although the invention is described in relationship to a two cycle, internal combustion engine, it should be apparent that the invention is equally appropriate and adaptable to a four cycle engine.

It is thus an object of the instant invention to provide a method of operating a two cycle engine which exhibits substantially reduced $NO_X$ emission.

It is a further object of the instant invention to provide a method of operating a two cycle, natural gas fueled, turbocharged engine which exhibits substantially reduced $NO_X$ emissions.

It is a still further object of the instant invention to provide a method of operating a two cycle, turbocharged engine which exhibits substantially reduced $NO_X$ emissions without an accompanying loss in engine efficiency.

It is a still further object of the instant invention to provide a method of operating a two cycle, large bore, natural gas fueled, high pressure turbocharged engine incorporating jet cell ignition which exhibits substantially reduced emissions and negligibly increased fuel consumption.

Other objects and advantages of the invention will become apparent from the following descriptions, with reference being made to the accompanying drawings.

DESCRIPTION OF THE PREFERRED EMBODIMENT

STRUCTURE

Figure 1:
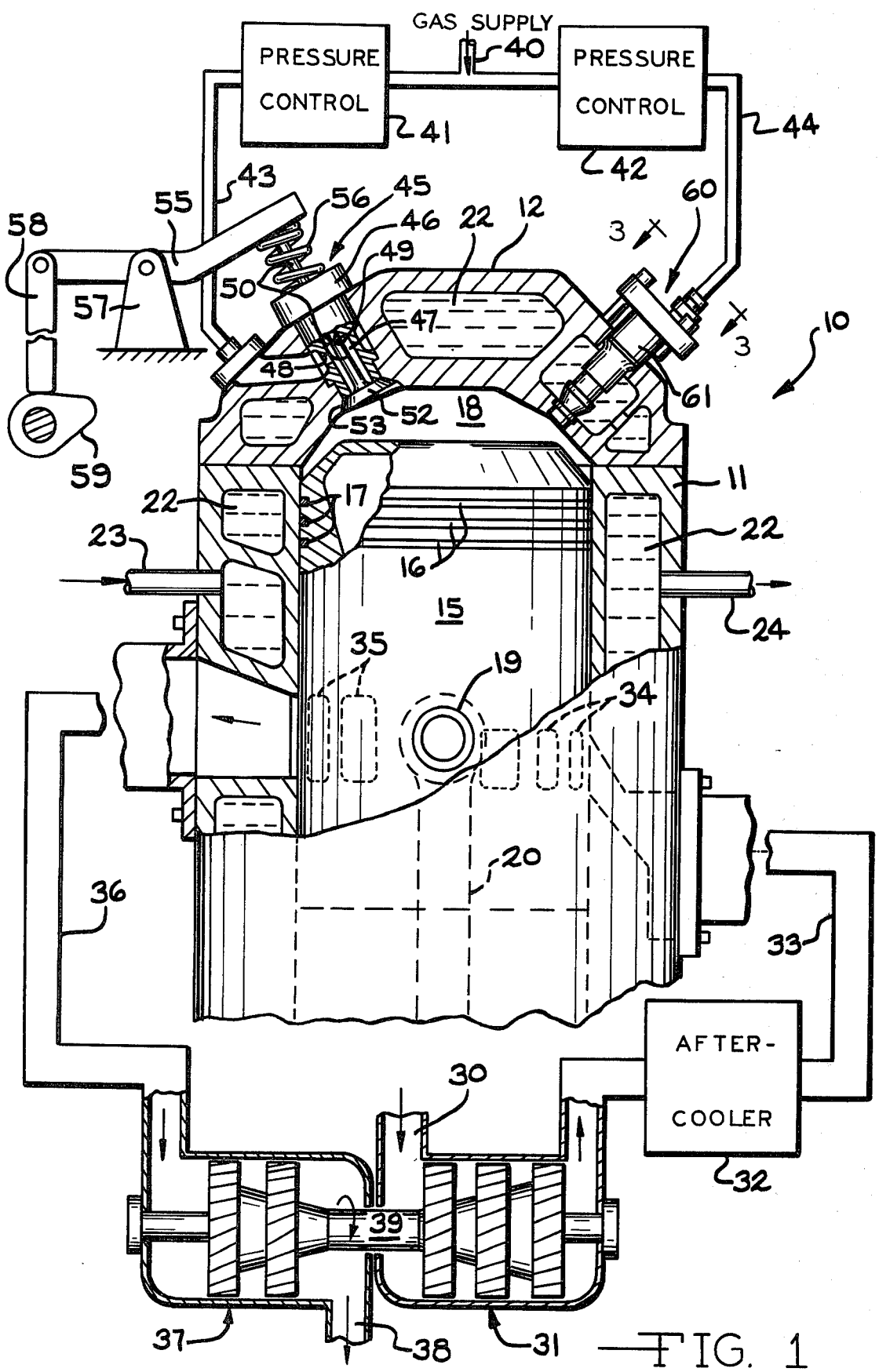
FIG. 1 is a side elevational, fragmentary, section view of a two cycle, turbocharged, internal combustion engine incorporating the instant invention, taken along line 1—1 of FIG. 4.

Referring now to FIG. 1, an engine exhibiting low $NO_X$ emissions is illustrated and generally designated by the reference numeral 10. Fur purposes of clarity, the subsequent illustrations and description will be directed to the structure and function of an individual cylinder. However, it should be understood that an engine incorporating the features and operated according to this disclosure may comprise one, two, eight, twelve or more cylinders.

The engine 10 includes a cylinder 11 which is secured to an engine block (not shown) at one end and terminated by a cylinder head 12 at the other. The cylinder head 12 is retained on the cylinder 11 by a plurality of head bolts 13, shown in FIG. 4. Slidably positioned within the cylinder 11 is a piston 15 which includes a plurality of piston rings 16 retained in circumferential channels 17 in the sidewall of the piston 15. The cylinder 11, the cylinder head 12 and the piston 15 together define a combustion chamber 18 and the piston rings 16 ensure the retention of various gases within the combustion chamber 18 during the operation of the engine 10. The cylinder 15 further includes a horizontally disposed wrist pin 19 which pivotally secures a crank 20. The opposite end of the crank 20 is pivotally attached to the engine crankshaft (not shown) and transfers power from the combustion chamber 18 and the piston 15 to the crank shaft in a conventional manner.

The compression ratio of the engine 10 is preferably 8 to 1. However, as will be explained in detail in the operation section, the general insensitivity of the engine 10 to pre-spark detonation of the air/fuel charge in the combustion chamber 18 permits the utilization of higher compression ratios up to as great as 11 to 1 with attendant improvements in thermal efficiency. It should also be understood that the stated 8 to 1 compression ratio may be lowered to as low as 4 to 1 should fuel characteristics or operating conditions so require.

The cylinder 11 and the cylinder head 12 further include a plurality of connected passageways 22 which are filled with water and provide a cooling water jacket to remove the heat generated by the operation of the engine 10. An inlet fitting 23 and an outlet fitting 24 supply and withdraw, respectively, cooling water from the passageways 22 which form the water jacket of the engine 10.

The engine 10 incorporates a turbocharged air system. Air from the atmosphere enters an intake passageway 30 and is compressed by compressor 31. The outlet or manifold pressure of the compressor 31 is, of course, a function of the instantaneous operating conditions of the engine 10. However, it may be stated generally that the outlet or manifold pressure will be in the range between fifteen and thirty inches of mercury which, given comparable operating conditions, is as much as 45-50% higher than the inlet manifold pressure of a conventional turbocharged engine. From the compressor 31 the compressed air travels to a conventional aftercooler 32 wherein the temperature of the air is reduced. The cooled, compressed air then travels through an inlet passageway or manifold 33 and into the cylinder 11. The cylinder 11 includes inlet ports 34 which are in communication with the manifold 33 and allow the compressed air to enter the combustion chamber 18 when the piston 15 has opened the ports 34 by virtue or its reciprocating travel within the cylinder 11.

Likewise, the cylinder 11 includes exhaust ports 35 which are opened and closed by the reciprocating passage of the piston 15. The exhaust ports 35 are in communication with an exhaust manifold 36 which carries the exhaust gases from the combustion chamber 18 to the inlet side of an expander turbine 37. The exhaust gases expand, drive the turbine 37 and are exhausted to the atmosphere through an exhaust passageway 38. In accordance with conventional practice, the expander turbine 37 is mounted upon a common shaft 39 with the compressor 31 and transfers power thereto to affect the compression of the inlet air.

In accordance with common turbocharger practice, the exhaust manifold 36 and the expander turbine 37 may include a jet air assist (not shown) which is used during the startup of the engine 10. The jet air assist supplies compressed air to the inlet of the turbine 37 which rotates the turbine 37 and the compressor turbine 31 which in turn compresses fresh air for use by the engine 10. Details of the jet air assist are conventional and it will therefore not be further discussed.

The operating parameters of the turbocharger assembly will be explained in greater detail in the operation section of this specification. However, various steady-state operating parameters are disclosed in Table 1 and reference should be made thereto regarding a general comparison between the operation of a conventional large bore, natural gas engine and the low $NO_X$ engine of the instant invention.

As discussed previously, the engine 10 is preferably fueled by natural gas and a gas line 40 external to the engine 10 supplies gas to the engine at approximately 100 p.s.i. The engine 10 incorporates two active gas pressure regulators or controllers 41 and 42. The controller 41 adjusts the pressure of the gaseous fuel delivered to the main combustion chamber 18 in proportion to the speed of the engine 10. The range of pressure adjustment of the controller 41 is from 30 to 90 p.s.i. which corresponds to idle r.p.m. up to maximum r.p.m. Devices such as the controller 41 are commonly linked to engine governor (not shown) and mechanically adjusts the gas pressure in a manner well known in the internal combustion engine art.

A gas line 43 carries the gaseous fuel from the controller 41 to a main fuel inlet valve assembly 45. The main gas inlet valve assembly 45 comprises a generally cylindrical housing 46 which defines a relatively large concentric chamber 47 in communication with the gas line 43 through a radial passageway 48. The main valve assembly housing 46 further defines a smaller, coaxial passageway 49 through which a stem 50 of a valve 51 passes. The valve 51 is sealingly and slidably positioned within the passageway 49. The valve 51 further includes a valve head 52 having beveled surfaces of conventional design which seat against a complimentarily beveled seat 53 in the cylinder head 12. The stem 50 of the valve 51 extends through and beyond the housing 46 and is in contact with a conventional rocker arm 55. Positioned between adjacent, substantially parallel surfaces of the rocker arm 55 and the main gas valve housing 46 is a return spring 56 which functions in a conventional manner. The rocker arm 55 is pivoted about a fixed pivot 57 and is driven by a connecting rod 58 reciprocatingly driven by a suitable engine operating timing cam 59. The timing cam 59 is operably connected to and synchronized with the rotation of the crankshaft (not shown) of the engine 10 and thus opens and closes the valve 51 in timed relation to the rotation of the crankshaft and the reciprocating travel of the piston 15. The return spring 56 returns the rocker arm 55 to the unactivated position illustrated in FIG. 1 which coincides with the dwell of the cam 59. A spring (not shown) positioned about the valve stem 50 returns the valve 51 to its closed position when the rocker arm 55 is in the unactivated position just described.

Figure 5:
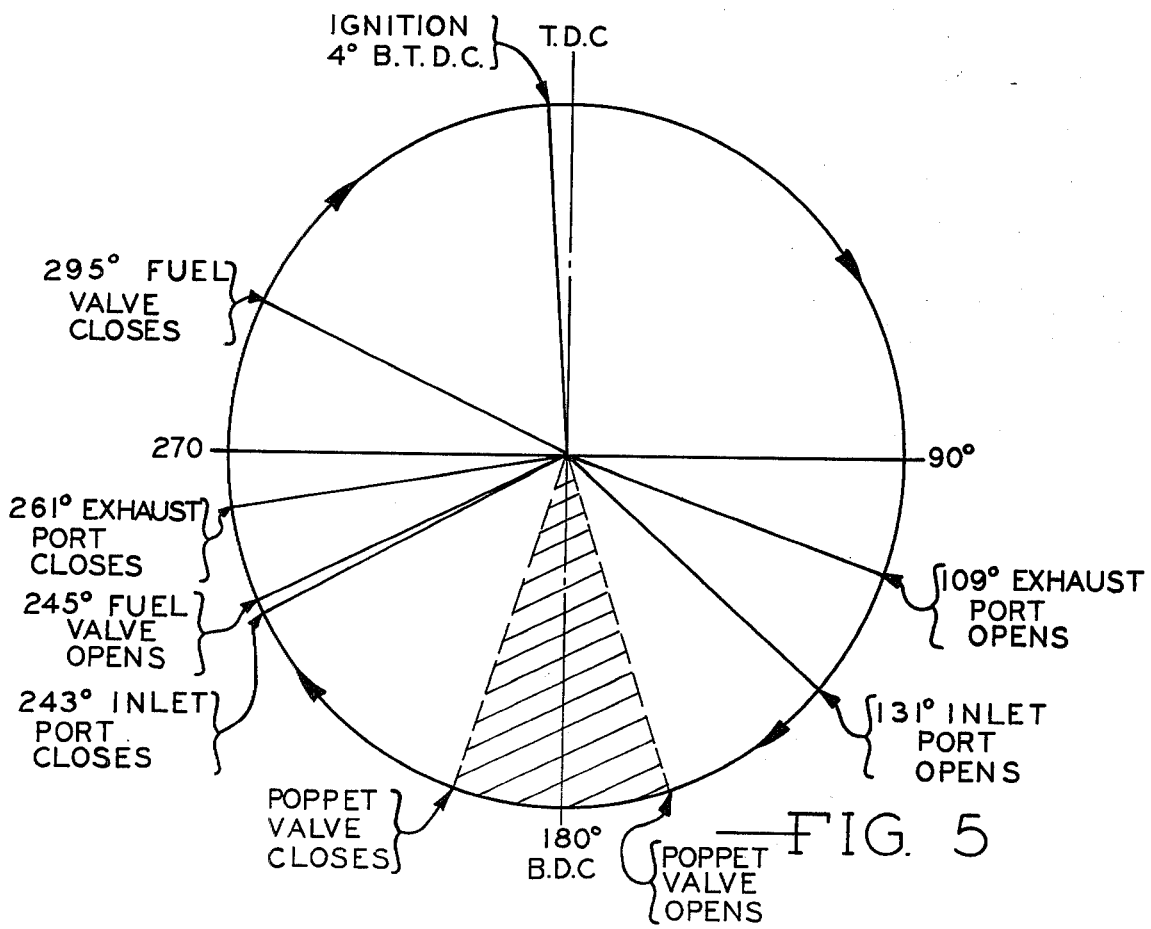
FIG. 5 is an event diagram illustrating the timing of the various combustion functions of an engine according to the instant invention.

The timing of the main gas valve assembly 45, i.e., the opening and closing of the valve 51 in relation to the rotation of the crankshaft and the position of the piston 15, is shown in FIG. 5 and will be described in greater detail in the operation section of this specification. Generally, however, it can be stated that the opening and closing of the valve 51 will occur approximately 10°-15° later than the opening and closing of a fuel valve operating in a conventional two cycle engine.

Figure 4:
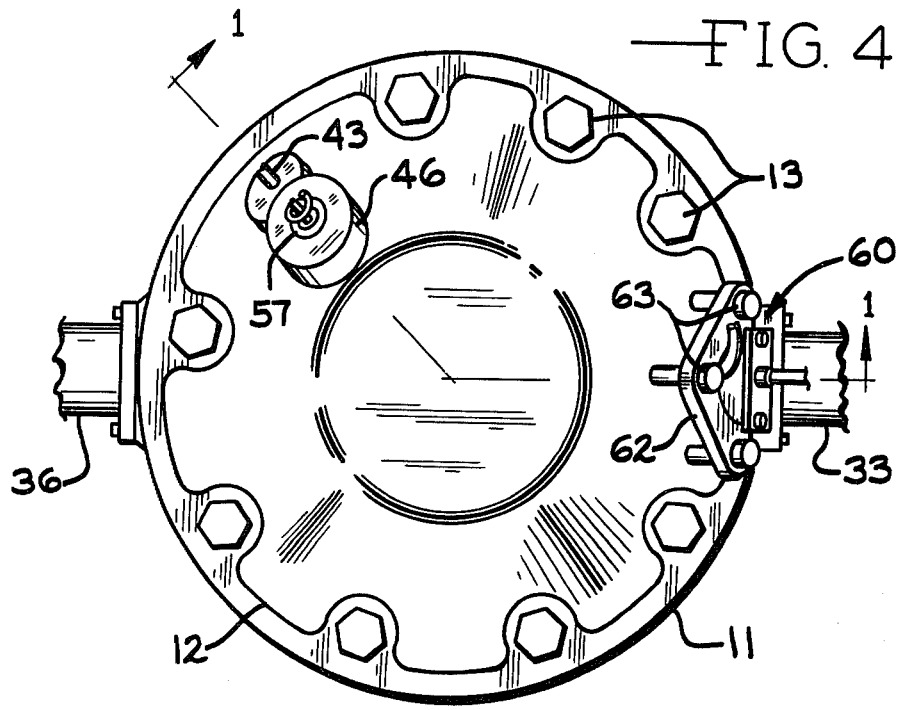
FIG. 4 is a top plan view of a cylinder head of the instant invention.

Referring now briefly to FIG. 4, the positioning of components on the cylinder head 12 may be seem. The cylinder head 12 is secured to the cylinder 11 by a plurality of head bolts 13, as previously described. The inlet manifold 33 and exhaust manifold 36 are also visible at the left and right sides of the cylinder 11, respectively. Displaced at an angle of approximately 45° from a diametral line bisecting the inlet and exhaust manifolds 33 and 36 is the main gas valve housing 46. Disposed coincidently with the diametral line connecting the inlet and exhaust manifolds 33 and 36 is a jet cell ignition assembly 60.

Referring again to FIG. 1, the gas line 40 also supplies gaseous fuel to the second controller 42. The controller 42 adjusts the pressure of the fuel delivered to the jet cell ignition assembly 60 in accordance with the speed of the engine 10 and the pressure within the inlet manifold 33. Typically, the delivered gas pressure of the controller is between 15 and 30 p.s.i. The controller operates according to the equation $$P = \frac{4M + S}{2} - K$$

where P equals the delivered gas pressure in a gas line 44, in pounds per square inch; M equals the pressure in the inlet manifold 33, in pounds per square inch; S is an instrument air speed signal in the range 3 to 15 pounds per square inch which is proportional to engine speed; and K is a correction constant preferably having a value of 13 to 14. Increased values of K will lower the pressure of the gas in the line 44 and vice versa. The controller 42 may be any mechanical or electrical analog control device which functions in a manner well known in the internal combustion engine art.

Figure 2:
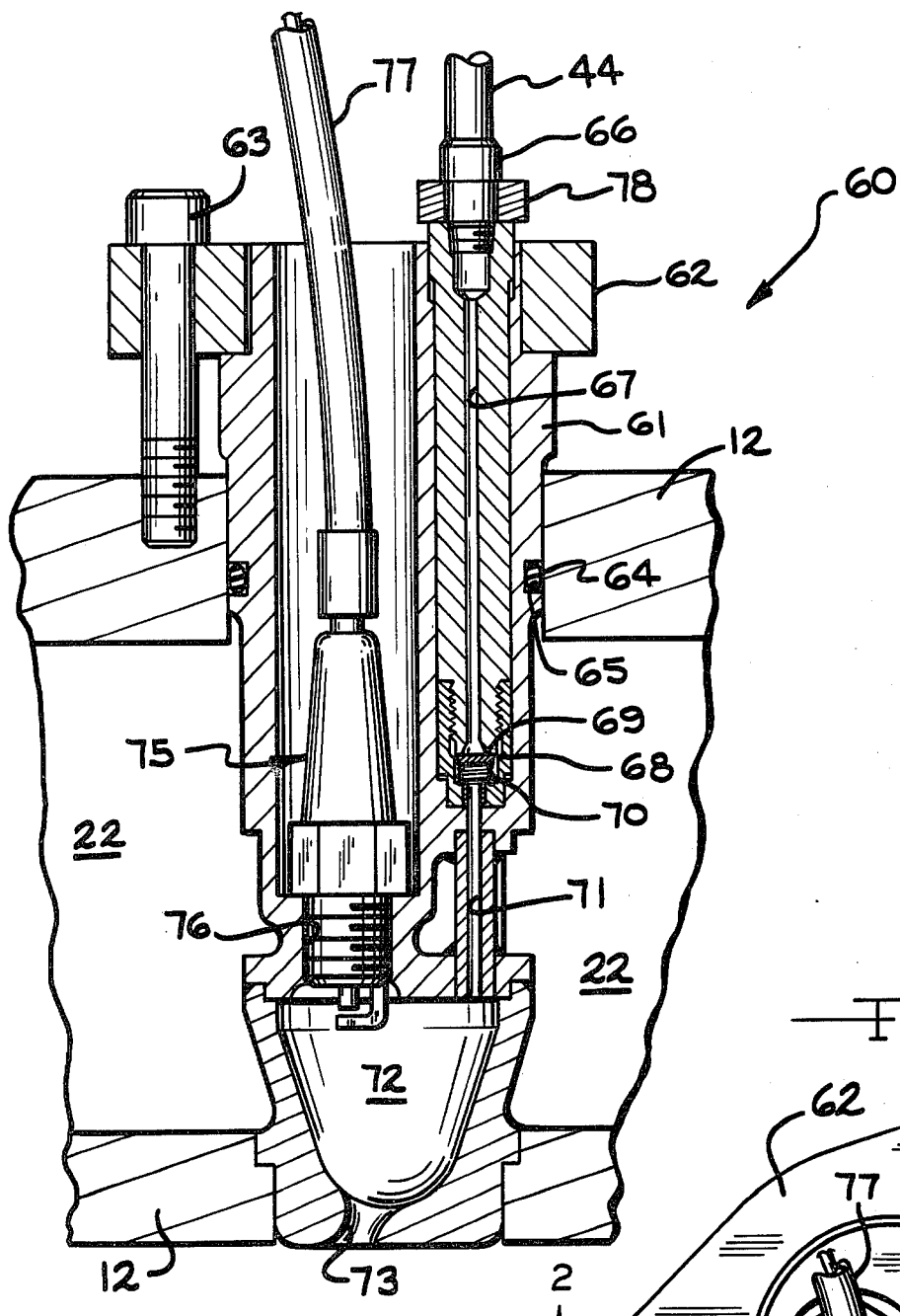
FIG. 2 is an enlarged full sectional view of a jet cell ignition device utilized in the instant invention, taken along line 2—2 of FIG. 3.

Referring again to FIG. 1 and also to FIG. 2, the jet cell ignition assembly 60 is seen to comprise a generally elongate compartmentalized cylinder 61 which extends from without the cylinder head 12, through the passageways 22 of the water jacket and into the combustion chamber 18. The elongate cylinder 61 is retained in position on the cylinder head 12 by means of a generally triangular collar 62 which is in turn secured to the cylinder head 12 by means of a plurality of threaded fasteners 63. An O-ring seal 64 is seated in a circumferential channel 65 in the outer wall of the elongate cylinder 61. The circumferential channel 65 is positioned axially such that the O-ring seal 64 contacts the outer wall of the cylinder head 12 and tightly seals off the water passageway 22. The jet cell ignition assembly 60 further includes an inlet fitting 66 which secures the gas line 44 from the controller 42. Secured to the ignition assembly 60 by the inlet fitting 66, the gas line 44 is in communication with an axial passageway 67. The axial passageway 67 terminates within a small cavity 68 which contains a poppet valve 69 and a biasing spring 70. The poppet valve 69 seats against and closes off the axial passageway 67 due to the spring force of the biasing spring 70. The spring constant and thus the tension of the spring 70 is selected such that the poppet valve disk 69 is seated due to the force of the spring 70 whenever the pressure of the gas in the passageway 67 times the area of the poppet valve disk exposed thereto is less than the pressure of the gases on the opposite side of the poppet valve disk 69 times its exposed area plus the force of the spring 70. Conversely, the poppet valve disk 69 will move off its seat against axial passageway 67 and allow gas into the cavity 68 whenever the force tending to move it away from axial passageway 67 which is the product of the pressure of the gas in the passageway 67 and the area of the poppet valve disk 68 exposed to it is greater than the force of the spring 70 plus the pressure of the gases in the cavity 68 times the area of the poppet valve disk 68 exposed to it. The elongate cylinder 61 further defines an axial passageway 71 which is coaxially aligned with the axial passageway 67 and serves to carry the gas from the cavity 68 into a jet cell combustion chamber 72. The jet cell combustion chamber 72 is of generally conical shape and tapers toward an offset orifice 73 which communicates with the combustion chamber 18. The orifice 73 is preferably angled generally toward the axial and radial center of the clearance volume of the combustion chamber 18. The jet cell ignition assembly 60 further includes a spark plug 75 of conventional design which is threaded into a mating opening 76 in the elongate cylinder 61. The spark plug 75 is connected by a high tension lead 77 to an ignition system (not shown) of conventional design which provides a timed burst of high voltage electrical energy in synchronous relation to the position of the piston 15 of sufficient strength to ignite the gas/air mixture contained within the jet cell ignition chamber 72.

Functionally, the total energy which the jet cell ignition assembly 60 provides must be sufficient to consistently and uniformly ignite the charge of gaseous fuel and air within the main combustion chamber 18. The volume of the combustion chamber 72 is the most important parameter influencing its total energy output. This is the result of the obvious relationship between charge volume and energy output and a less obvious relationship between chamber volume and operating temperature. As the volume of the jet cell combustion chamber 72 increases, its operating temperature increases due to the higher combustion energy of the contained charge and the decreased water jacket heat transfer surface area per unit of combustion chamber volume. Within limits, this is beneficial since this characteristic may be matched to the characteristics of the air/fuel mixture therein and specifically to the detonation temperature of the fuel such that the steady state operating temperature of the walls of the combustion chamber 72 are somewhat below the detonation temperature of the air/fuel mixture.

A fresh air/fuel charge is thus heated by the walls of the jet cell combustion chamber 72 to a temperature somewhat below its detonation point. The spark plug 75 ignites the mixture within the combustion chamber 72 and flame propogation and combustion are almost instantaneous due to the pre-flame conditions.

While it is clear that various gaseous fuels having a spectrum of octane ratings and various air/fuel ratios will exhibit different detonation temperatures, and that optimum ignition and flame propagation will result from different jet cell combustion chamber volumes and steady state operating temperatures, for natural gas fuels mixed at air/fuel ratios of approximately 13 to 1, by weight, a chamber volume of approximately 1.8% of the clearance volume of the main combustion chamber 18 has been found preferable. The volume of the jet cell combustion chamber 72 expressed as a percentage of the main combustion chamber 18 clearance volume may vary from somewaht less than 1.4 to slightly above 2.2.

Figure 3:
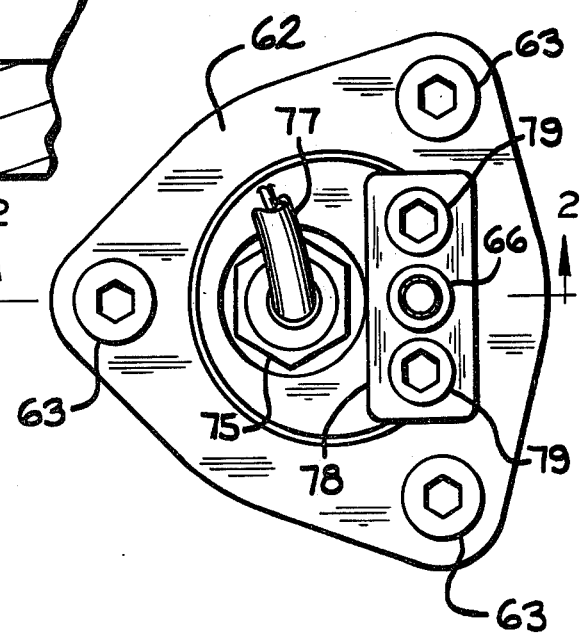
FIG. 3 is a top plan view of a jet cell ignition device of the instant invention taken along line 3—3 of FIG. 1.

Referring briefly to FIG. 3, the generally triangular collar and the threaded fasteners 63 which retain the elongate cylinder 61 in the cylinder head 12 are seen. Note that the spark plug 75 and high tension lead 77 are also visible. The inlet fitting 66 is retained on the elongate cylinder 61 by means of a rectangular retaining collar 78 which is in turn secured to the elongate cylinder by a pair of threaded fasteners 79.

OPERATION

The dramatic reduction in NO and $NO_2$ emissions of a large bore, turbocharged engine operating according to the instant invention is the result of several structural modifications and operational compromises. As has been previously noted, the formation of $NO_X$ emissions has been determined to be sensitive to the air/fuel ratio. The higher the air/fuel ratio, the lower the $NO_X$ emissions. Although the mechanism of $NO_X$ formation is not completely understood, it has been postulated that the lean mixture burns at a somewhat controlled rate and at a lower temperature than a conventional, richer air/fuel mixture. This lower combustion temperature discourages the dissociation of the diatomic nitrogen molecules also present within the combustion chamber and thus lowers the $NO_X$ constituents of the exhaust.

In the method of the instant invention, this lean air-fuel ratio is supplied by the turbocharger components 30–39 which increase the operating pressures of the combustion system by approximately 45% over those associated with a conventional turbocharged engine.

An engine operating under the general conditions described above and the specific conditions delineated in Table 1 and containing a single or multiple conventional spark plug assembly will exhibit erratic combustion and power output. The jet cell assembly 60 thus provides sufficient energy to consistently and completely combust a lean main air/fuel charge in the combustion chamber 18.

FIG. 5 is an event diagram which illustrates the sequence of events in the two cycle turbocharged engine 10. The reference numbers refer to the rotational position of the crankshaft in degrees beginning at top dead center (TDC) and moving clockwise around the circular diagram. It should be understood that the various stated crankshaft timings are preferred timings. They should not be considered to be absolute timings inasmuch as various fuels, compression ratios, spark timings, manifold pressures and extrinsic factors may dictate an adjustment of one or more stated timings in accordance with common and accepted internal combustion engine practice.

At top dead center, the piston 15 will begin its power stroke as the air/fuel mixture within the main combustion chamber 18 undergoes combustion and expansion. At 109° of crankshaft rotation, the head of the piston 15 will begin to expose the exhaust ports 35 and the exhaust gases will begin to move into the exhaust manifold 36. As the exhaust gases exit the main combustion chamber 18, the pressure therein is reduced and at 131° of crankshaft rotation the piston head begins to expose the inlet ports 34. Due to both the reduced pressure within the main combustion chamber 18 and the pressure of the fresh air within the inlet manifold 33, fresh air fills the main combustion chamber and scavenges the remaining products of the previous combustion cycle.

The crown of the piston 15 and that of the cylinder head 12 as well as the placement of the inlet and exhaust ports 34 and 35 produce an upwardly, arcuately directed air flow which scavenges the upper regions of the combustion chamber 18 as well as a radially and horizontally directed air flow which scavenges the regions of the combustion chamber 18 adjacent the inlet and exhaust ports 34 and 35. Such scavenging is commonly referred to as loop scavenging. It should be noted that as is illustrated in FIG. 4, the jet cell ignition assembly 60 is positioned directly above the air inlet manifold 33 and inlet ports 34. This positioning ensures a supply of fresh air in the vicinity of the orifice 73.

Subsequent to the opening of the inlet ports 34, the poppet valve disk 69 which supplies gaseous fuel to the jet cell combustion chamber 72 will move off its seat due to the differential between the forces exerted upon its opposite faces. Since the pressure of the gaseous fuel in the passageway 67 is a function of both the air pressure within the inlet manifold 33 and the speed of the engine 10, as is fully explained in the preceeding section of this specification, the precise opening time of the poppet valve disk 69 cannot be referenced to the rotational position of the crankshaft. Rather, the poppet valve disk 69 will open over a range of crankshaft positions generally centered about bottom dead center (BDC) of the crankshaft as is shown in FIG. 5. Likewise, the poppet valve disk 69 will reseat and close off the fuel passageway 67 at some time not precisely related to crankshaft rotation when the differential between the forces exerted upon its opposite faces changes due to the changing pressure within the main combustion chamber 18.

As the crankshaft continues to rotate, loop scavenging and the ingestion of fresh air continues until the head of the piston 15 closes off the inlet ports 34 at 243° of crankshaft travel. Next, at 245° of crankshaft travel, the timing cam 59 activates the main gas valve assembly 45 which opens and supplies fuel to the main combustion chamber 18. Subsequently, at 261° of crankshaft travel, the top of the piston 15 closes off the exhaust ports 35 and the compression of the gases that are within the combustion chamber 18 begins. (The asymmetry of the crankshaft position between the opening and closing of the inlet ports 34 and the exhaust ports 35 is due to the articulated crankshaft utilized in the engine 10.) As the charge in the main combustion chamber 18 is compressed, fresh air moves through the orifice 73 and mixes with the charge of gaseous fuel admittted to the jet cell combustion chamber 72 by the poppet valve disk 69 as previously explained. The main fuel valve 45 closes at a crankshaft position of 295°. Meanwhile, the compression of the charge within the main combustion chamber 18 and flow of a portion of that charge through the orifice 73 and into the jet cell combustion chamber 72 continues.

The preferable air to fuel ratio in the main combustion chamber 18 and the jet cell combustion chamber 72, for convenience, will be described according to three conventions: air/fuel ratio by weight, air/fuel ratio by volume and equivalence ratio which is the ratio of the mixture to the ideal or stoichoimetric ratio.

By weight, the stoichiometric ratio is 14:1. As explained, the air to fuel ratio within the main combustion chamber 18 is lean and is preferably between 18:1 and 22.5:1 whereas the richer mixture within the jet cell ignition chamber 72 is preferably between 12.5:1 and 14:1.

By volume, the stoichiometric ratio is 9.8:1. The air to fuel ratio within the main combustion chamber 18 is preferably between 12.7:1 and 15.7:1 whereas the mixture within the jet cell combustion chamber 72 is preferably between 8.8:1 to 9.8:1.

The equivalance ratio of a stoichiometric air/fuel mixture is, of course, unity. The equivalance ratio of the mixture within the main combustion chamber 18 is preferably between 1.3 and 1.6 whereas the equivalence ratio of the mixture within the jet cell combustion chamber 72 is preferably between 0.9 and 1.0. By simple mathematical manipulation, the equivalance ratio expresses the percent of excess (or deficient) air in a given air/fuel mixture. Thus the main combustion chamber charge preferably includes 30% to 60% excess air whereas the jet cell charge is preferably 10% to 0% deficient in air.

At 356° or 4° before top dead center, the spark plug 75 is supplied with a burst of high voltage electrical energy from a conventional ignition system. Since the air/fuel charge within the jet cell combustion chamber 72 is at an elevated temperature and relatively rich, the combustion of the charge due to the spark from the spark plug 75 is almost instantaneous and the high temperature burned and burning gases issue from the orifice 73 into the main combustion chamber 18. Due to the high temperature and substantial energy of the gases issuing from the jet cell combustion chamber 72, ignition of the lean main air/fuel charge within the main combustion chamber 18 is rapidly and consistently achieved. The crankshaft and the piston 15 pass top dead center and begin the expansion or power stroke.

Figure 6:
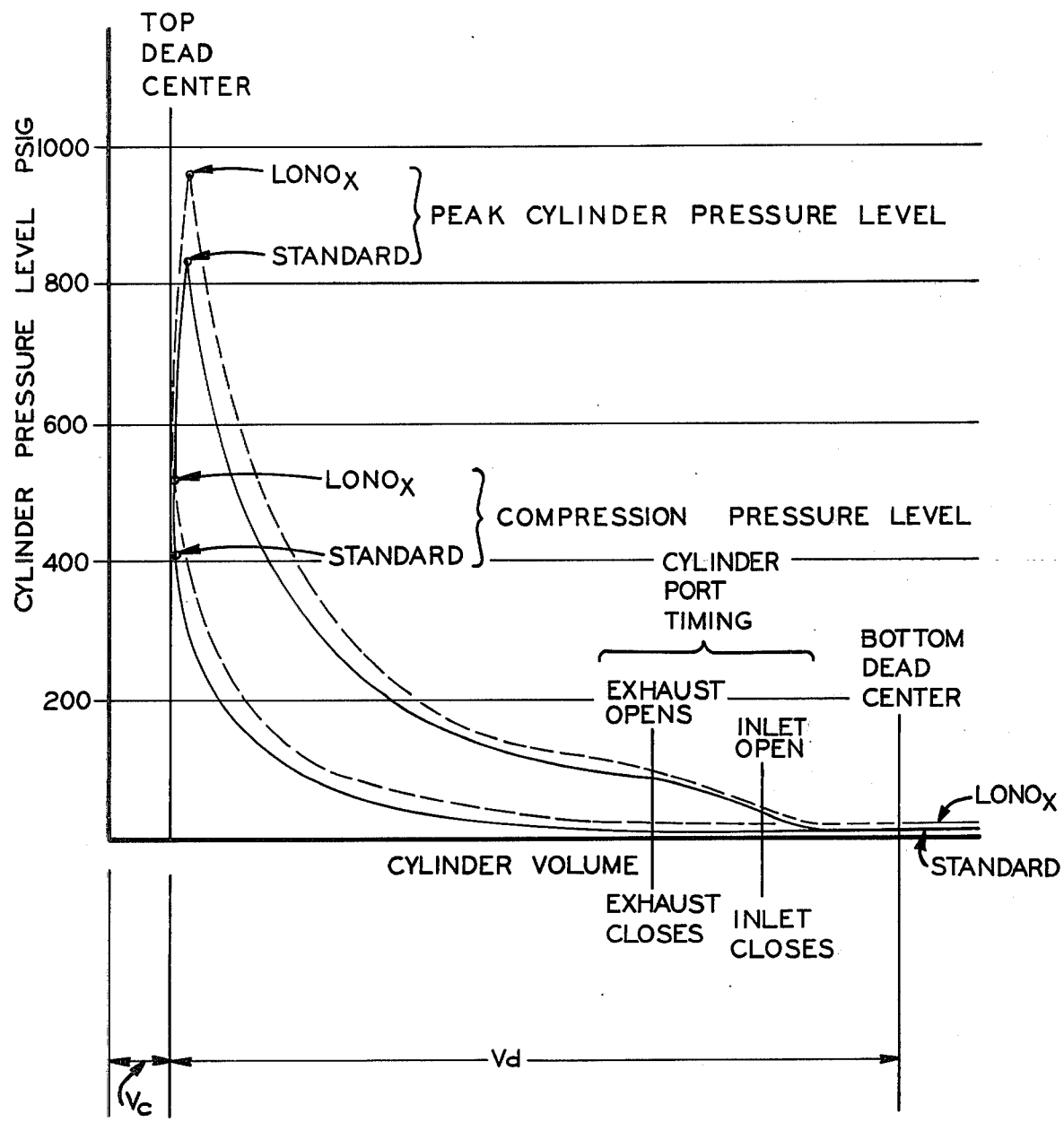
FIG. 6 is a graph which illustrates air cylinder volume versus cylinder pressure levels for a conventional engine as well as the engine of the instant invention.

The cylinder pressure as a function of cylinder volume in both a standard turbocharged two cycle engine and an engine operating according to the instant invention is illustrated in FIG. 6. The horizontal scale or abscissa represents the relative volume of the cyinder, i.e., the volume of the combustion chamber 18 and is divided into two regions. One, $V_C$ represents the clearance volume of the cylinder, i.e., that volume remaining between the top of the piston 15, the walls of the cylinder 11 and the cylinder head 12 when the piston 15 is at top dead center and a second area $V_D$ which represents the displacement volume which is the bore times the stroke of the piston 15. The solid line represents the pressure versus volume curve of a standard engine whereas the dashed line represents the pressure versus volume curve of an engine exhibiting low $NO_X$ emissions operated according to the instant invention. Note that in all cases the pressure of the low $NO_X$ engine is above the corresponding pressure of a standard engine. It is also important to note that the pressures at bottom dead center, to the extreme right of the graph are representative of the delivered turbocharger pressures and that as is evidenced by Table I, the pressure delivered by the turbocharger of the low $NO_X$ emission engine is substantially above the delivered air pressure of a conventional engine.

Figure 7:
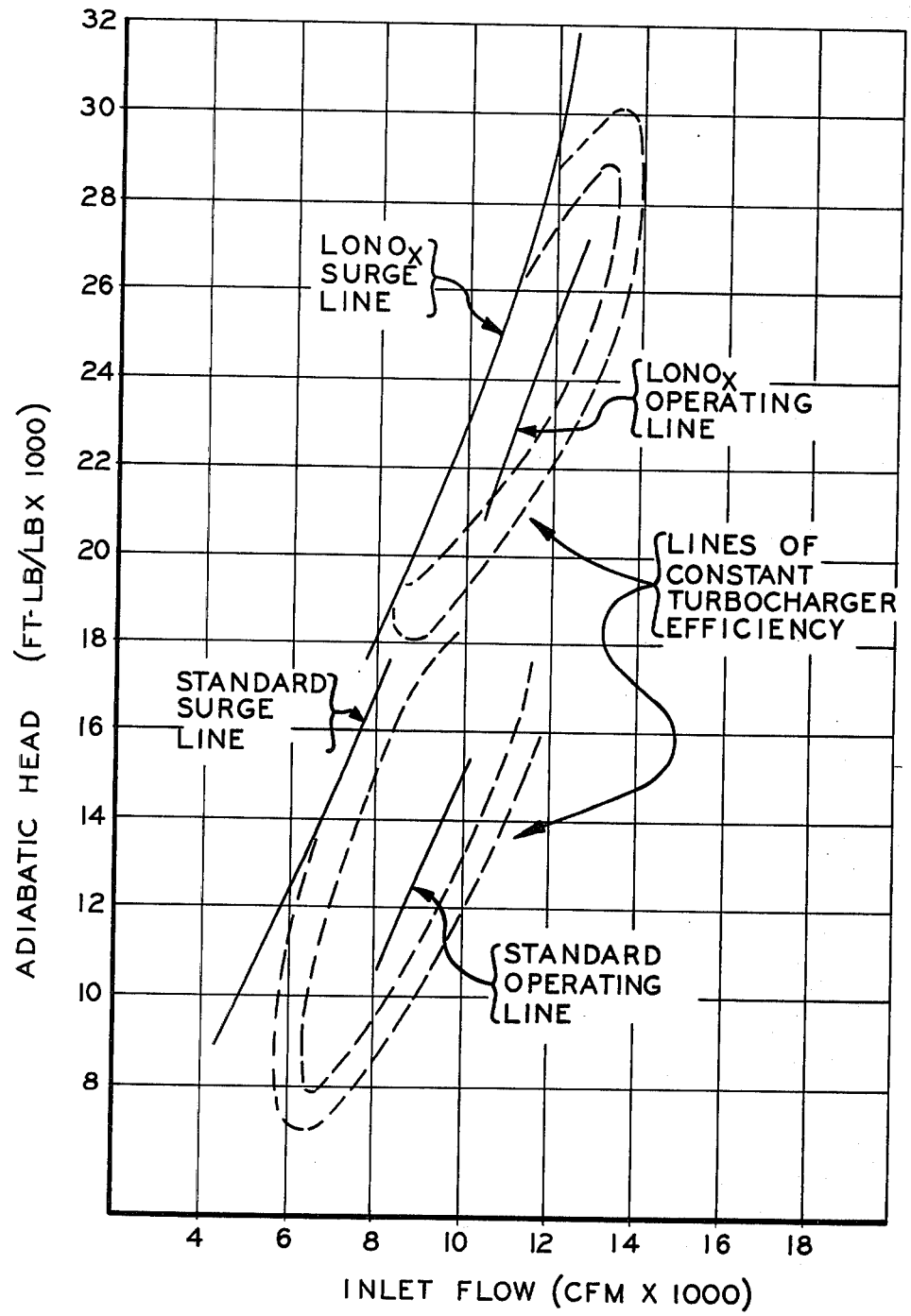
FIG. 7 is a graph illustrating constant efficiency design curves for conventional turbochargers and the turbochargers utilized in the instant invention.

The substantial pressure differential between the low $NO_X$ emission engine of the instant invention and a conventional engine is the result of a modified turbocharger design. FIG. 7 illustrates the shift of the turbocharger operating lines and lines of constant turbocharger efficiency. Whereas conventional two cycle large bore engine turbocharger designs call for delivered adiabatic heads in the range of 12,000–14,000 foot-pounds per pound of air, the turbocharger utilized herein exhibits optimum performance in the range between 22,000 and 26,000 foot-pounds per pound of air. FIG. 7 makes it apparent, however, that while the adiabatic head design parameter of the turbocharger incorporated into the instant invention is increased by a factor of approximately two, the actual air flow only increases by a factor of approximately 25%. Table I also delineates such flow increases wherein the air flow is expressed as a percent of cylinder displacement and, for example, increases at 100% load from 182% of cylinder displacement to 208% of cylinder displacement.

It should be apparent to one skilled in internal combustion engine and turbocharger art that the operating conditions described in FIG. 7 are optimum conditions for the particular engine herein described. Two cycle engines having somewhat different combustion chamber shapes, inlet and exhaust port configurations and other structural distinctions may, of course, require some modification to these operating curves.

In addition to reduced unburned hydrocarbon emissions and greatly reduced nitric oxide and nitrogen dioxide emissions, the basic lean burn method of combustion of the instant invention also exhibits advantages with regard to fuel flexibility. Because of the lean fuel/air mixture and the relatively low compression ratio, temperatures and pressures within the combustion chamber during the compression stroke of the engine remain well below the detonation point of many hydrocarbon fuels. Such reduced detonation sensitivity allows the use of increasingly heavy paraffinic hydrocarbon fuels. Thus, fully acceptable combustion will be achieved with not only any mixture of methane and ethane in natural gas but with mixtures including the heavier paraffinic hydrocarbons having lower octane numbers such as propane, N-butane, iso-butane, N-pentane and iso-pentane as well. It should be apparent that all the foregoing fuels may not combust properly across the entire range of compression ratios (4:1 to 11:1) previously described in this specification. However, most will perform satisfactorily at the preferred compression ratio of 8:1—the compression ratio at which the data in Table I was recorded. Furthermore, the usable combinations of fuel and compression ratio are markedly broadened by the instant invention inasmuch as low octane fuels heretofore unusable at a given compression may now be so utilized.

Reduced emissions, consistent ignition and thus smooth power output and greater fuel flexibility are not achieved by sacrificing fuel economy. The brake specific fuel consumption data of Table I details an average fuel consumption increase of approximately 2% at a compression ratio of 8:1. The option of increased compression ratios and their attendant higher thermal efficiencies made feasible by the lean air/fuel mixture's decreased sensitivity to detonation may be utilized to decrease fuel consumption.

It should thus be apparent that the engine and combustion method described herein are capable of achieving satisfactory combustion and power generation while utilizing a broad range of hydrocarbon fuels and delivering high fuel efficiencies and low hydrocarbon and $NO_X$ emissions. It should also be apparent that these operational goals are achievable in either a two cycle or four cycle engine operating according to the instant invention.

The foregoing disclosure is the best mode devised by the inventors for practicing this invention. It is apparent, however, that methods incorporating modifications and variations to the instant invention will be obvious to one skilled in the art of internal combustion engines. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

injecting a paraffinic hydrocarbon fuel into such jet cell ignition chamber to form a mixture richer than a stoichiometric mixture, further compressing said intake air and said mixture, injecting a paraffinic hydrocarbon fuel into such main combustion chamber while further compressing said intake air and said mixture to form a mixture within such main combustion chamber leaner than a stoichiometric ratio, igniting said mixture in such jet cell ignition chamber before full compression of said mixtures is achieved to form a stream of hot gases, and projecting said stream of hot gases into said mixture within such main combustion chamber to ignite said just recited mixture, whereby the products of combustion include total nitric oxide and nitrogen dioxide constituents of less than 350 parts per million.

2. The method of claim 1, wherein the stoichiometric weight ratio of said mixture in such jet cell combustion chamber just prior to ignition is between 12.5 to 1 and 14 to 1.

3. The method of claim 1, wherein the stoichiometric weight ratio of said mixture in such main combustion chamber just prior to ignition is between 18 to 1 and 22.5 to 1.

4. The method of claim 1, wherein energy of said

TABLE I

| Engine Load (% Full Load) | 75 | | 92 | | 100 | | 109* | | 116* | |
|---|---|---|---|---|---|---|---|---|---|---|
| Engine Type (Standard Or $LONO_X$) | STD | LNX | STD | LNX | STD | LNX | STD | LNX | STD | LNX |
| Ignition Timing (Degrees Before Top Center) | 11 | 4 | 11 | 4 | 11 | 4 | 11 | 4 | 11 | 4 |
| Air Flow (% Of Displacement) | 159 | 161 | 175 | 191 | 182 | 208 | 194 | 223 | 205 | 234 |
| Air Manifold Pressure (Inches Of Mercury) | 12.8 | 15.0 | 15.3 | 21.0 | 15.6 | 24.1 | 17.3 | 27.2 | 19.8 | 29.5 |
| Air Manifold Temperature (Degrees Fahrenheit) | 130 | 130 | 130 | 130 | 110 | 110 | 90 | 90 | 70 | 70 |
| Firing Pressure (Pounds Per Square Inch) | 720 | 795 | 905 | 915 | 925 | 985 | 975 | 1045 | 1050 | 1115 |
| Exhaust Temperature (Degrees Fahrenheit) | 710 | 658 | 717 | 670 | 720 | 616 | 701 | 672 | 729 | 665 |
| Cylinder Head Temperature (Degrees Fahrenheit) | 357 | 300 | 383 | 325 | 414 | 347 | 390 | 315 | 403 | 335 |
| Brake Specific Fuel Consumption (BTU/Horsepower-Hour) | 7490 | 7260 | 6768 | 7030 | 6717 | 7000 | 6702 | 6940 | 6640 | 6940 |
| $NO_X$ Emissions (Grams/Horsepower-Hour) | 6.7 | 2.2 | 9.2 | 3.9 | 11.7 | 3.4 | 11.8 | 3.1 | 10.6 | 3.7 |
| $NO_X$ Emissions (Parts per million) | 637 | 180 | 1135 | 311 | 1024 | 267 | 1045 | 255 | 926 | 330 |

*The 109% and 116% engine load conditions and the data thereunder relate operation in accordance with an accepted industry scheme which permits as much as 16% additional load to be applied to an internal combustion engine when the ambient temperature drops from 80° F. to 40° F.

We claim:

1. The method of operating an internal combustion engine comprising the steps of:
    compressing intake air to a pressure between 15 and 30 inches of mercury,
    moving said intake air through a heat extraction device to remove at least a portion of the heat of compression,
    moving said intake air into a main combustion chamber of such internal combustion engine,
    moving a portion of said intake air into a jet cell ignition chamber having an internal volume less than 3% of the clearance volume of such main combustion chamber, removed products of combustion is utilized to perform said step of compressing intake air.

5. The method of claim 1, wherein each of said steps occurs once during each reciprocating cycle of the piston of such engine.

6. The method of claim 1, wherein said paraffinic hydrocarbon fuel comprises substantially ethane and methane.

7. The method of operating a two cycle internal combustion engine comprising the steps of:
    compressing intake air to a pressure between 15 and 30 inches of mercury,
    reducing the temperature of such compressed intake air, moving said compressed intake air into a main combustion chamber of such internal combustion engine, moving less than about 3% of said compressed air into a jet cell ignition chamber, supplying natural gas fuel to such engine in quantities less than about 7300 BTU/horsepower hour, injecting a portion of said natural gas fuel into such jet cell ignition chamber to form a mixture having a stoichiometric weight ratio between 12.5 to 1 and 14 to 1, further compressing said intake air and said mixture to a pressure above 500 p.s.i., injecting the remaining portion of said natural gas fuel into such main combustion chamber while further compressing said intake air and said mixture to form a mixture within such main combustion chamber having a stoichiometric weight ratio between 18 to 1 and 22.5 to 1, igniting said mixture in such jet cell ignition chamber before full compression of said mixture is achieved to form a stream of hot gases, projecting said stream of hot gases into said mixture within such main combustion chamber to ignite said just recited mixture and, removing substantially all the products of combustion from such main combustion chamber and such jet cell ignition chamber, whereby said products of combustion typically include less than 350 parts per million total nitric oxide and nitrogen dioxide constituents.

8. The method of operating an internal combustion engine comprising the steps of:

turbocharging intake air to a pressure between 15 and 30 inches of mercury, reducing the temperature of such intake air by passing it through a heat extraction device, moving said turbocharged intake air into a main combustion chamber and an ignition cell of such internal combustion engine, said air in such ignition cell having a volume of less than 3% of the air in the clearance volume of such main combustion chamber, injecting a paraffinic hydrocarbon fuel into such ignition cell to form a mixture having a stoichiometric weight ratio between 12.5 to 1 and 14 to 1, further compressing said intake air and said mixture to a pressure above 500 p.s.i., supplying a paraffinic hydrocarbon fuel to such main combustion chamber to form a mixture within such main combustion chamber having a stoichiometric weight ratio between 18 to 1 and 22.5 to 1, igniting said mixture in such jet cell combustion chamber before full compression of said mixture is achieved, projecting said ignited mixture into said mixture within such main combustion chamber to ignite said just recited mixture and, whereby such operation produces products of combustion having total nitric oxide and nitrogen dioxide constituents of less than 350 parts per million.

9. The method of claim 8, wherein each of said steps occurs once during each reciprocating cycle of a piston of such engine.

10. The method of claim 8, wherein the compression ratio of such engine is greater than 6:1.

11. The method of claim 1 or claim 8 wherein such paraffinic hydrocarbon fuel is supplied to such engine at less than about 7300 BTU/horsepower hour.

12. The method of operating a two cycle internal combustion engine comprising the steps of:

compressing air to a pressure between about 15 to 30 inches of mercury, reducing the temperature of such compressed air, providing such compressed air to a main and an auxiliary combustion chamber of such engine, such auxiliary combustion chamber having a volume of less than 3% of the clearance volume of such main combustion chamber, providing a paraffinic hydrocarbon fuel to such auxiliary combustion chamber to form a mixture richer than a stoichiometric mixture, providing a paraffinic hydrocarbon fuel to such main combustion chamber to form a mixture leaner than a stoichiometric mixture, igniting said mixture in such auxiliary combustion chamber, directing said ignited mixture into said mixture in such main combustion chamber to ignite said just recited mixture, and removing substantially all of the combustion products from such main combustion chamber.

13. The method of claim 12, wherein products of combustion are utilized to provide energy to compress such air.

14. The method of claim 12, wherein such paraffinic hydrocarbon fuel comprises substantially ethane and methane.

15. The method of claim 12 wherein such paraffinic hydrocarbon fuel is supplied to such engine at less than about 7300 BTU/horsepower hour.

* * * * *